(12) United States Patent
Anhorn

(10) Patent No.: US 6,643,255 B1
(45) Date of Patent: Nov. 4, 2003

(54) NODE OF A POINT-TO-MULTIPOINT NETWORK

(75) Inventor: Jürgen Anhorn, Kornwestheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/353,353

(22) Filed: Jul. 15, 1999

(30) Foreign Application Priority Data

Jul. 16, 1998 (DE) .......................................... 198 32 039

(51) Int. Cl.⁷ ............................................ H04L 12/423
(52) U.S. Cl. ...................................... 370/222; 370/400
(58) Field of Search .............................. 370/217, 221, 370/242–251, 255–258; 359/110, 127, 117, 128, 137

(56) References Cited

U.S. PATENT DOCUMENTS

| | | | |
|---|---|---|---|
| 5,003,531 A | | 3/1991 | Farinholt et al. |
| 5,159,595 A | * | 10/1992 | Flanagan et al. ............ 370/224 |
| 5,199,025 A | * | 3/1993 | Miwa .......................... 370/224 |
| 5,442,623 A | * | 8/1995 | Wu .............................. 370/224 |
| 5,546,403 A | * | 8/1996 | Yamamoto et al. ......... 714/716 |
| 5,903,370 A | * | 5/1999 | Johnson ....................... 359/119 |
| 6,052,210 A | * | 4/2000 | Nathan ........................ 359/119 |
| 6,195,704 B1 | * | 2/2001 | Suita ........................... 709/239 |
| 6,201,622 B1 | * | 3/2001 | Lobbett et al. .............. 359/177 |
| 6,252,689 B1 | * | 6/2001 | Sharp .......................... 359/168 |
| 6,414,771 B2 | * | 7/2002 | Al-Salameh et al. ........ 359/128 |
| 6,426,815 B1 | * | 7/2002 | Koehler ....................... 359/119 |

FOREIGN PATENT DOCUMENTS

| | | |
|---|---|---|
| DE | 40 21 361 A1 | 1/1992 |
| DE | 196 50 088 A1 | 6/1998 |
| DE | 196 53 823 A1 | 6/1998 |
| EP | 0 788 249 A1 | 8/1997 |
| EP | 0 847 160 A2 | 6/1998 |
| JP | 05-252076 A | 9/1993 |
| JP | 09-261132 A | 10/1997 |
| WO | WO 97/01907 | 1/1997 |
| WO | WO 97/09803 | 3/1997 |

OTHER PUBLICATIONS

"Telcom Report" Siemens AG, No. 3/1996, pp. 10 to 13.
Haque, Izaz, et al.: "Self–Healing Rings in a Synchronous Environment" IEEE LTS, Nov. 1991, vol. 2, No. 4, pp. 30–37.

* cited by examiner

*Primary Examiner*—Chi Pham
*Assistant Examiner*—Thai Hoang
(74) *Attorney, Agent, or Firm*—Sughrue Mion, PLLC

(57) ABSTRACT

The invention has for its object to provide a network in which an optimized mode of operation is made possible both in the trouble-free case and on the occurrence of a disturbance. This object is attained by a network (NET) which is implemented with nodes (HUB2) as claimed in claim 1. The node according to the invention (HUB2) is characterized in that it not only receives signals but also transmits signals to adjacent nodes (HUB1, HUB3), and that it comprises only one detector (DET1) which detects the reception of signals from a preferred direction (HUB1) and controls the switch (S1) in such a way that in the trouble-free case, the signals received from the preferred direction (HUB1) are routed to a coaxial cable network and/or to an adjacent node (HUB3) located in a preferred direction, and that on the occurrence of a disturbance, the signals received from a reserve line are routed to the coaxial cable network and/or to an adjacent node (HUB1) located in the direction of the disturbance, whereby the reserve line is activated. In this manner, the nodes (HUB2) can control the reception and retransmission of the signals autonomously and independently of additional control equipment, such as a central switching assembly, and the reserve line is activated only on the occurrence of a disturbance.

8 Claims, 3 Drawing Sheets

NODE OF A POINT-TO-MULTIPOINT NETWORK

This invention relates to a node of a point-to-multipoint network as set forth in the preamble of claim 1.

In point-to-multipoint networks, e.g. in a cable distribution network with or without reverse channel, signals, such as cable television signals and/or telephone signals ("cablephone"), are generally transmitted from a center over two separate optical fiber links to several nodes in such a way that each of the nodes receives signals from both links. Each node serves a coaxial cable network with a plurality of terminals. Such a network structure is known from the journal "telecom report" of Siemens AG, No. 3/1996, pages 10 to 13.

The separate optical fiber links are provided to ensure that in the event of a disturbance, caused, for example, by a cable break or by insufficient amplification, it is not possible for individual nodes to receive no signals or only signals of reduced quality. In each node, the incoming signals on the two links are detected by means of two detectors, and only the signal with the higher level is routed onward via a switch.

A disadvantage of such networks is that both optical fiber links must constantly be operated at a high signal level, whereby much power is wasted, which also increases the aging rate of the network.

In the network disclosed in DE 19650088, two optical fiber links connected to a center end in a switching assembly which routes signals onward only if a disturbance is detected on one of the two optical fiber links. In this manner, a reserve link is activated on the occurrence of a disturbance, so that the performance of the network can be optimized for the error-free case. Disadvantages are that a separate switching assembly is needed, and that in the event of a disturbance, the supply of-signals to nodes depends on the proper operation of the switching assembly.

It is therefore an object of the invention to provide a network in which an optimized mode of operation is made possible both in the trouble-free case and on the occurrence of a disturbance.

This object is attained by a network inplemented with nodes as claimed in claim 1. The node according to the invention is characterized in that it not only receives signals but also transmits signals to adjacent nodes, and that it comprises only one detector which detects the reception of signals from a preferred direction and controls the switch in such a way that in the trouble-free case, the signals received from the preferred direction are routed to a coaxial cable network and/or to an adjacent node located in a preferred direction, and that upon detection of a disturbance, the signals received from a reserve line are routed to the coaxial cable network and/or to an adjacent node located in the direction of the disturbance, whereby the reserve line is activated. In this manner, the nodes can control the reception and retransmission of the signals autonomously and independently of additional control equipment, such as a central switching assembly, and the reserve line is activated only on the occurrence of a disturbance.

If the reserve line is activated only on the occurrence of a disturbance, it can be used for other transmissions in the trouble-free case. For example, by providing a launching device and an extracting device in each node, the reserve line can additionally be used for the transmission of data, such as data of an Intranet of an enterprise, or security-insensitive data, such as Internet data.

Further advantageous features of the invention are defined in the dependent claims.

Three embodiments of the invention will now be described with reference to the accompanying drawings, in which.

Figure 1:
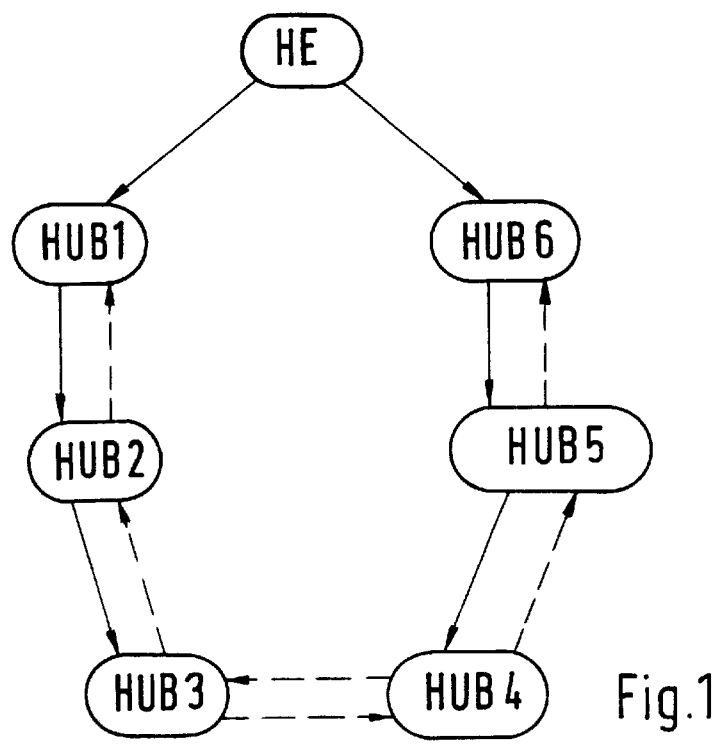
FIG. 1 is a schematic of a network according to the invention.

The first embodiment will now be explained with reference to FIGS. 1 to 4. FIG. 1 shows a network according to the invention, NET. The network NET is designed as a point-to-multipoint network and particularly as a unidirectional distribution network, for example as a network for distributing cable television signals from a center HE to a plurality of terminals (not shown to simplify the illustration). The network NET can be readily converted to a bidirectional network, for example by using an existing telephone network or a second distribution network as a reverse channel; this also makes it possible to implement services such as cablephone, service-on-demand, video-on-demand, and/or the like. The invention can be applied to unidirectional and bidirectional networks. For the sake of simplicity, a unidirectional distribution network has been chosen in FIG. 1.

Besides the center HE, which is also referred to as a "head end", the network NET comprises six nodes HUB1, HUB2, HUB3, HUB4, HUB5, HUB6, which are connected in series. The center HE is connected to the two initial nodes HUB1 and HUB6. The two initial nodes HUB1, HUB6 are interconnected via a series combination of the four nodes HUB2, HUB3, HUB4, HUB5.

Signals, e.g. cable television signals, are transmitted from the center HE to the nodes HUB1, HUB2, HUB3, HUB4, HUB5, HUB6 over two different paths, with two main trunk lines and two reserve lines being provided, namely one main trunk line and one reserve line for the three nodes HUB1, HUB2, HUB3, and one main trunk line and one reserve line for the three nodes HUB4, HUB5, HUB6. The three nodes HUB1, HUB2, HUB3 are supplied with signals from the center HE over the first main trunk line. The first main trunk line is represented by continuous lines. The three nodes HUB4, HUB5, HUB6 are supplied with signals from the center HE over the second main trunk line. The second main trunk line is also represented by continuous lines. The three nodes HUB1, HUB2, HUB3 are supplied with signals from the node HUB4 over the first reserve line if a disturbance occurs on the first main trunk line between center HE and node HUB1. The first reserve line is indicated by dashed lines. The three nodes HUB4, HUB5, HUB6 are supplied with signals from node HUB3 over the second reserve line if a disturbance occurs on the second main trunk line between center HE and node HUB6. The second reserve line is also indicated by dashed lines.

Connected to each of the nodes HUB1, HUB2, HUB3, HUB4, HUB5, HUB6 is a coaxial cable network (not shown for simplicity) for distributing the cable television signals to a plurality of terminals.

Each of the nodes HUB2, HUB3, HUB4, HUB5 has two adjacent nodes, to which it is directly connected. The nodes adjacent to HUB2 are HUB1 and HUB3, those adjacent to node HUB3 are HUB2 and HUB4, those adjacent to node HUB4 are HUB3 and HUB5, and those adjacent to node HUB5 are HUB4 and HUB6.

The center HE is connected to the two initial nodes HUB1, HUB6 via optical fiber links, such as glass optical fibers. The nodes HUB2, HUB3, HUB4, HUB5 are connected to their adjacent nodes HUB1, HUB3; HUB2, HUB4; HUB3, HUB5; HUB4, HUB6 via optical fiber links. Each of the nodes HUB1, HUB2, HUB3, HUB4, HUB5, HUB6 includes an optical-to-electrical converter for converting the received optical signals to electric ones and then transmitting the electric signals over the coaxial cable network.

The links between the center HE and the initial nodes HUB1, HUB6 are unidirectional links. They may also be of bidirectional design in order to enable the center HE, for example, to receive the signals transmitted by it, at least in the event of a disturbance on a main trunk line, and, for example, to detect the signal level and readjust the transmitted signal level if the detected signal level is too high or too low.

Each of the nodes HUB2, HUB3, HUB4, HUB5 is suitable for receiving signals from its two adjacent nodes HUB1, HUB3; HUB2, HUB4; HUB3, HUB5; HUB4, HUB6 over a main trunk line and a reserve line and for transmitting signals to its two adjacent nodes HUB1, HUB3; HUB2, HUB4; HUB3, HUB5; HUB4, HUB6 over a main trunk line and a reserve line or over two reserve lines and in a third direction, e.g. into the coaxial cable network.

Figure 2:
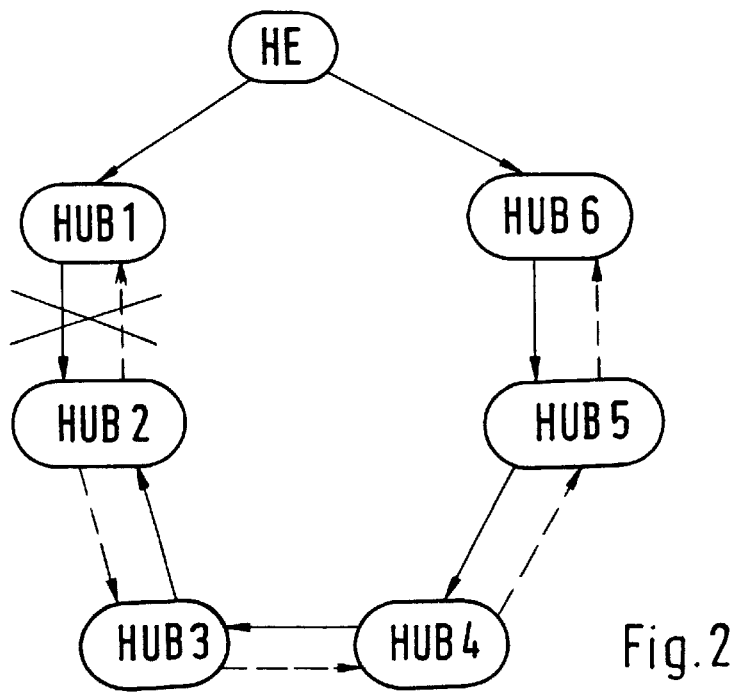
FIG. 2 shows the network of FIG. 1 on the occurrence of a disturbance.

FIG. 2 shows the network of FIG. 1 on the occurrence of a disturbance between the node HUB1 and the node HUB2. As a result of the disturbance, caused, for example, by a cable break, signals can no longer be transmitted from node HUB1 to node HUB2. Node HUB2 detects that it is receiving no signals or signals of insufficient quality from node HUB1, and switches over to receive signals from node HUB3 over the first reserve line.

Similarly, node HUB3 detects that it is receiving no signals or signals of insufficient quality from node HUB2, and switches over to receive signals from node HUB4 over the first reserve line. The node HUB1 thus continues to be supplied with signals from the center HE directly over the first main trunk line, while the nodes HUB2, HUB3, HUB4, HUB5, HUB6 are supplied with the signals from the center HE over the second main trunk line and over the first reserve line, which is indicated in FIG. 2 by the continuous lines.

Figure 3:
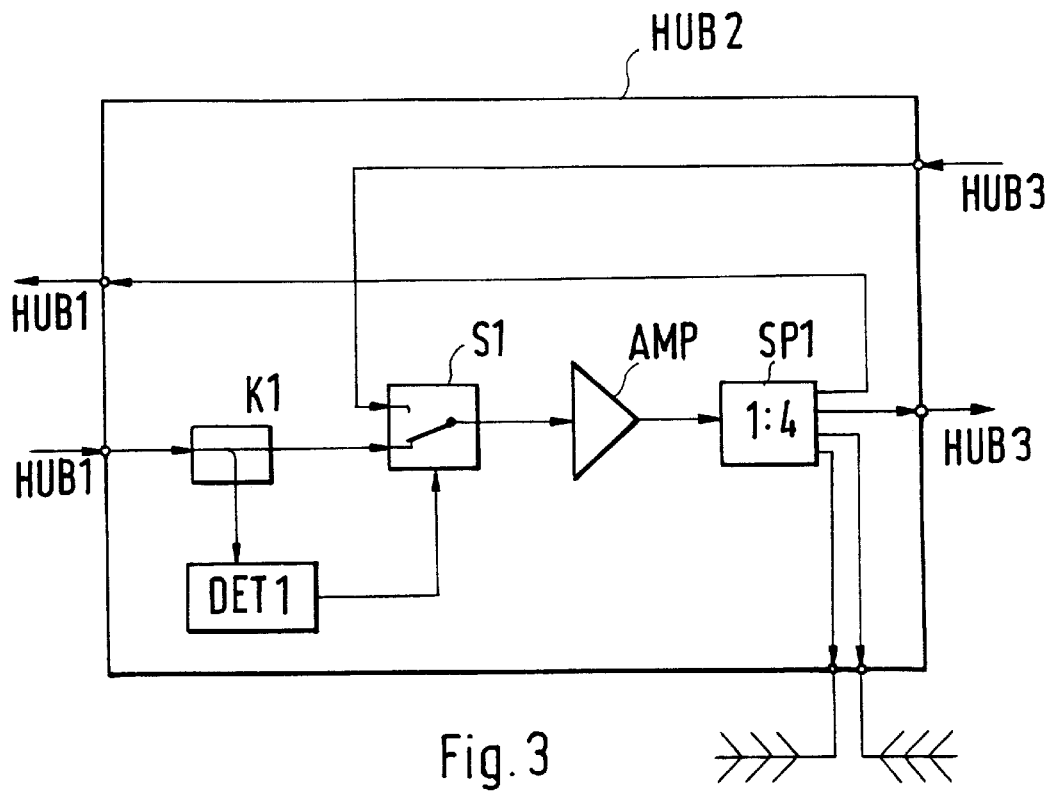
FIG. 3 is a schematic block diagram of a first node according to the invention for the network of FIG. 1.

FIG. 3 shows a first node according to the invention for the network of FIG. 1. The node shown is HUB2. The construction of nodes HUB3, HUB4, HUB5 is comparable to that of HUB2. The construction of nodes HUB1, HUB6 is also comparable to that of node HUB2, with the difference that the connection from the respective node to the center HE is optional.

The node HUB2 includes a detector DET1 for detecting disturbances in the signals received from the adjacent node HUB1, and a switch S1 controllable by the detector DET1 to route the signals received from the adjacent node HUB1 to the other adjacent node HUB3 and in the third direction, i.e., to the coaxial cable network, and, if a disturbance is detected in the signals received from the adjacent node HUB1, to route the signals received from the other adjacent node HUB3 to the adjacent node HUB1 and in the third direction.

The node HUB2 has a first input for receiving signals and a first output for transmitting signals, which are connected to the adjacent node HUB1, as well as a second input for receiving signals and a second output for transmitting signals, which are connected to the adjacent node HUB3.

The switch S1 is implemented as an optical switch. The first input is connected to the second output via a series combination of an optical coupler K1, the switch S1, and an optical splitter SP1. One output of the optical coupler K1 provides the input signal for the detector DET1. The second input of the node HUB2 is connected to the switch S1, and the first output is connected to the optical splitter SP1.

In a preferred embodiment, an optical amplifier AMP is connected between switch S1 and optical splitter SP to amplify the signals to be routed onward. The node HUB2 has a third output for transmitting signals in the third direction and a fourth output for transmitting signals in a fourth direction, for example into a further coaxial cable network or to a further node. The optical splitter SP1 is designed to duplicate the amplified signals at least twice, in this embodiment three times, with each of the output signals of the optical splitter SP1 being passed to a respective one of the outputs of the node HUB2. Thus, the first output signal of the optical splitter SP1 is routed to node HUB1, the second output signal is routed to node HUB3, the third output signal is routed in the third direction, and the fourth output signal is routed to the fourth output.

Thus, in the trouble-free case, it is determined via the optical coupler K1, which taps off 10% of the received signal level, for example, and passes it to the detector DET1 and which transfers 90% of the received signal level to the switch S1, and the detector DET1, which is designed, for example, as a threshold detector or a comparator, whether the level of the signal received from the node HUB1 is high enough to serve all terminals of the subsequent coaxial cable network, for example. If that is the case, the switch S1 will be controlled by the detector DET1 to route the signals received from the node HUB1 to the amplifier AMP. The amplifier AMP, which is implemented, for example, as an erbium-doped fiber amplifier, amplifies the signals and then applies them to the optical splitter SP1. The optical splitter SP1 is composed, for example, of three 2×2 couplers interconnected in a tree configuration, so that four signals are generated. If asymmetrical couplers are used, signals with different levels can be generated in order to meet different requirements. For the transmission to the adjacent nodes HUB1, HUB3, for example, a lower signal level is necessary than for the transmission in the coaxial cable network. The output signals from the optical splitter SP1 are distributed to the four outputs, taking into account their adapted levels if necessary.

If the detector DET1 detects a disturbance in the signals received from the node HUB1, it will change the position of the switch S1, so that the signals received from the node HUB3 over the reserve line will be routed to the amplifier AMP, the optical splitter SP, and then to the four outputs.

Figure 4:
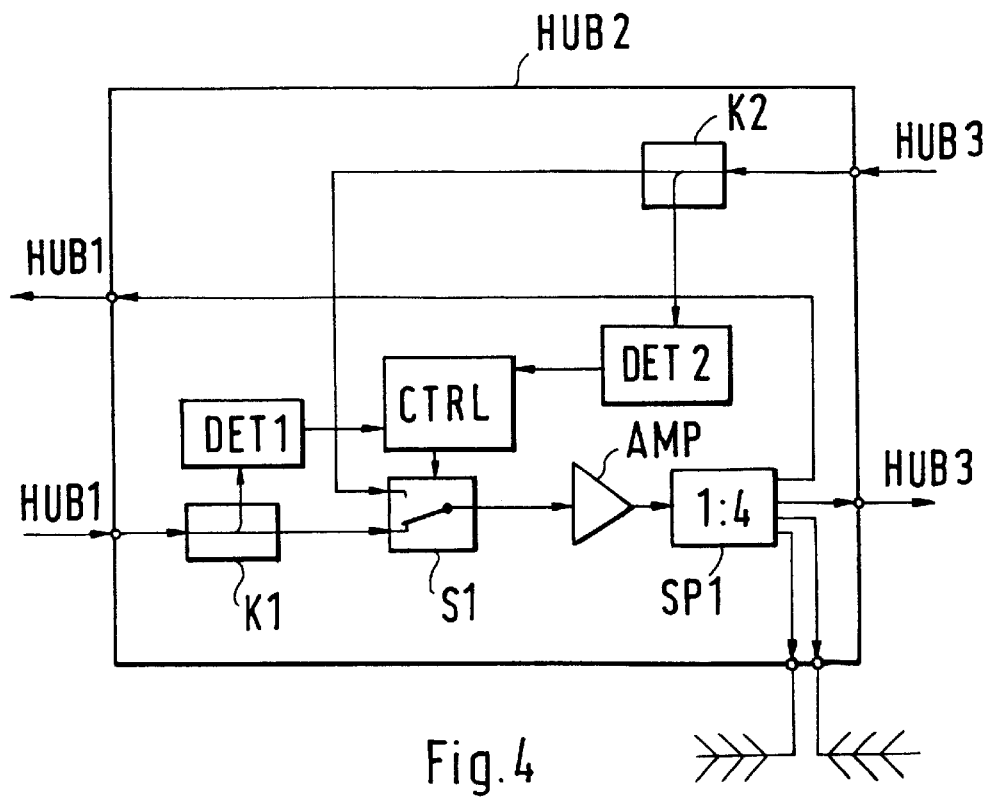
FIG. 4 is a schematic block diagram of a preferred embodiment of the node of FIG. 3.

FIG. 4 shows a preferred embodiment of the node of FIG. 3. The node HUB2 of FIG. 4 corresponds in its structure and functionality to the node of FIG. 3 with the difference that it additionally includes a further optical coupler K2, a further detector DET2, and a control unit CTRL. The further optical coupler K2 is connected between the second input of the node HUB2 and the switch S1 so that one of its outputs provides the input signal for the detector DET2. The detector DET2 serves to detect disturbances in the signals received from the adjacent node HUB3. The control unit CTRL is connected between the two detectors DET1, DET2 and the switch S1 to control the switch S1 in accordance with the output signals from the detectors DET1, DET2 using a predetermined switching matrix.

The coupler K2 is implemented, for example, as an asymmetrical coupler which taps off 10% of the received signal level and applies it to the detector DET2 and which transfers 90% of the signal level to the switch S1. The detector DET is designed as a comparator, for example, to compare the signal level applied to it with a predetermined level and feed the result to the control unit CTRL. The control unit CTRL is implemented, for example, as a programmable logic device, such as a field programmable gate array (FPGA) or a complex programmable logic device (CPLD). The control unit CTRL incorporates a programmed switching matrix which in the simplest case contains the following:

1. Detector DET1 detects a sufficient signal level. Irrespective of what detector DET2 detects, switch S1 is controlled to route the signals received from node HUB1 to amplifier AMP.
2. Detector DET1 detects no sufficient signal level, and detector DET2 detects a sufficient signal level. Switch S1 is controlled to route the signals received from node HUB3 to amplifier AMP.
3. Detector DET1 detects no sufficient signal level, and detector DET2 detects no sufficient signal level. Switch S1 is controlled to route the signals received from node HUB1 to amplifier AMP.

By this programming, a preferred direction of reception, namely the direction from node HUB1, is implemented. As a rule, the distance from the center HE to node HUB2 via node HUB1 will be shorter than that via node HUB3, so that signals received from node HUB1 will have a higher level than signals received from node HUB3. To be able to detect and pass on the signals with the higher level even on the occurrence of disturbances which are caused not by a cable break but, for example, by material fatigue resulting in a level reduction, the control unit CTRL may also be programmed so as to always select the higher one of the detected signal levels and control the switch to route the signals with the higher level to the amplifier AMP regardless of the direction of reception.

Figure 5:
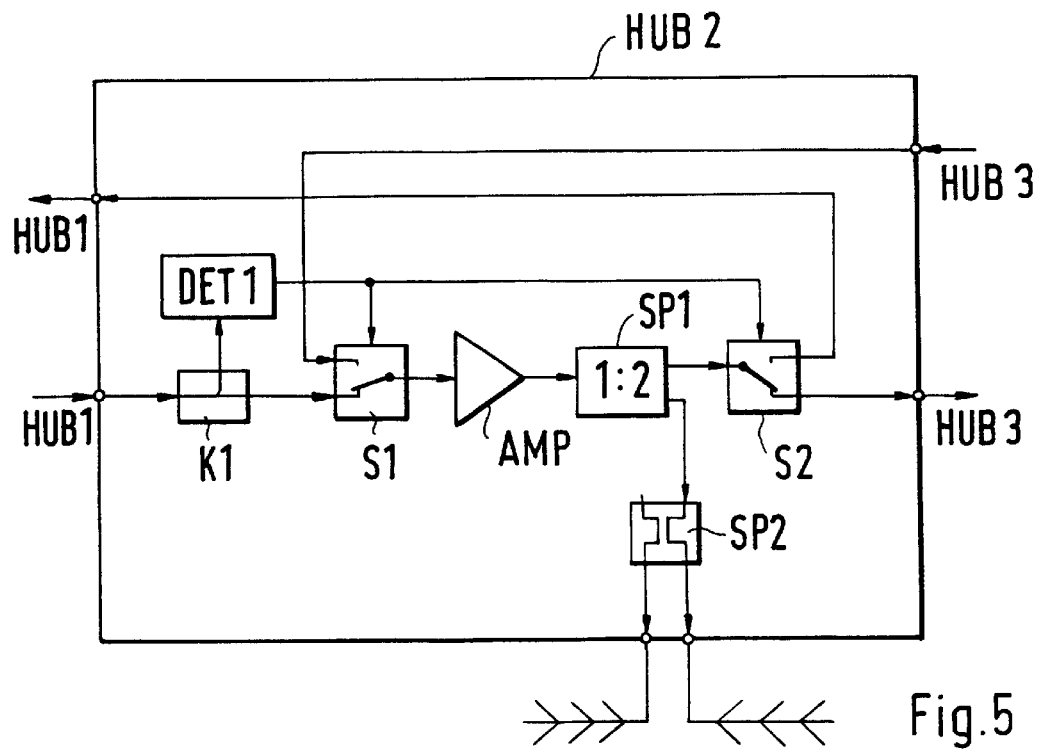
FIG. 5 is a schematic block diagram of a second node according to the invention for the network of FIG. 1.

The second embodiment will now be explained with reference to FIG. 5. FIG. 5 shows a node according to the invention, HUB2, for use in the network of FIG. 1. The structure of the nodes HUB3, HUB4, HUB5 is comparable to that of HUB2. The structure of the nodes HUB1, HUB6 is also comparable to that of the node HUB2, with the difference that the connection from the respective node to the center HE is optional.

The node HUB2 of FIG. 5 includes a detector DET1 for detecting disturbances in the signals received from the adjacent node HUB1, and a switch S1 controllable by the detector DET1 to route the signals received from the adjacent node HUB1 to the other adjacent HUB3 and in the third direction, i.e., to the coaxial cable network, and, if a disturbance is detected in the signals received from the adjacent node HUB 1, to route the signals received from the other adjacent node HUB3 to the adjacent node HUB 1 and in the third direction.

The node HUB2 has a first input and a first output, which are connected to the adjacent node HUB1, as well as a second input and a second output, which are connected to the adjacent node HUB3. The switch S1 is implemented as an optical switch. The first input of the node HUB2 is connected to the second output via a series combination of an optical coupler K1, the switch S1, an optical splitter SP1, and a further optical switch S2, which is also controllable by the detector DET1. One output of the optical coupler K1 provides the input signal for the detector DET1. The second input of the node HUB2 is connected to the switch S1, and the first output is connected to the further optical switch S2.

In a preferred embodiment, an optical amplifier AMP is connected between switch S1 and optical splitter SP1 to amplify the signals to be routed onward. Each of the nodes HUB2, HUB3, HUB4, HUB5 has at least a third output for transmitting signals in at least the third direction. The optical splitter SP1 duplicates the amplified signals at least once, with one output signal of the optical splitter SP1 being applied to the further switch S2, and a further output signal of the optical splitter SP1 being passed to the third output of the node HUB2.

In the optical coupler K1, 10% of the level of the signals received from node HUB1, for example, are tapped off and applied to the detector DET1, which determines whether the tapped signal level lies above or below a predetermined value. If the predetermined value is exceeded, the detector will control the switches S1 and S2 in such a way that the signals received from node HUB1 are routed through the amplifier AMP and the optical splitter SP1 to the node HUB3 and to the third output, i.e., into the coaxial cable network. The optical splitter SP1 is implemented, for example, as a 2×2 coupler, one output signal of which is fed to the switch S2, while the other is provided to the third output. A further optical splitter SP2, which is also implemented as a 2×2 coupler, for example, may be connected between the optical splitter SP1 and the third output of the node.

In this manner, two separate coaxial cable networks can be supplied with signals.

If the signal level detected in the detector DET1 falls below the predetermined value, the detector DET1 will control the switches S1 and S2 to route the signals received from node HUB3 through the amplifier AMP and the optical splitter SP1 and through the optical splitter SP2, if present.

In another preferred embodiment, the node HUB2 includes a further optical coupler, a further detector, and a control unit, these three elements being not shown in order to simplify the illustration. The further optical coupler is connected between the second input of the node HUB2 and the switch S2, so that one of its outputs provides the input signal for the further detector. The further detector is provided for detecting disturbances in the signals received from the adjacent node HUB3. The control unit is connected between the two detectors and the switches to control the switches in accordance with the output signals from the two detectors using a predetermined switching matrix in a similar manner as in the node of FIG. 4.

Figure 6:
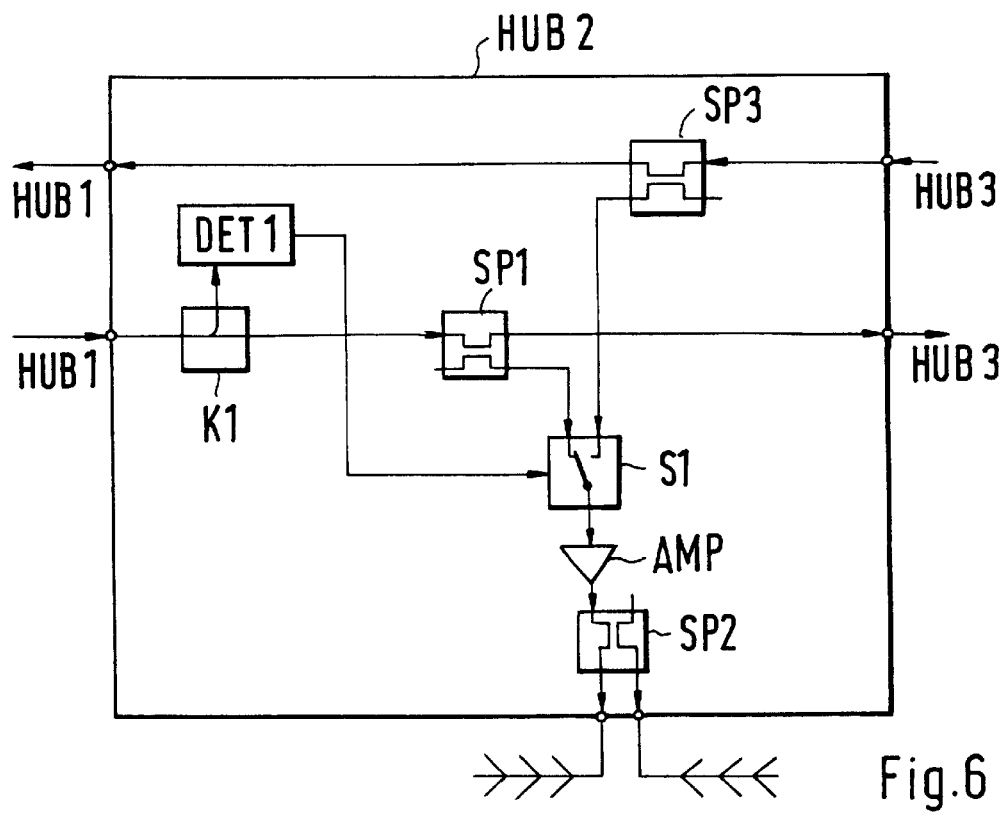
FIG. 6 is a schematic block diagram of a third node according to the invention for the network of FIG. 1.

The third embodiment will now be explained with reference to FIG. 6. FIG. 6 shows a node according to the invention, HUB2, for use in the network of FIG. 1. The construction of the nodes HUB3, HUB4, HUB5 is comparable to that of HUB2. The construction of the nodes HUB1, HUB6 is also comparable to that of the node HUB2, with the difference that the connection from the respective node to the center HE is optional.

The node HUB2 includes a detector DET1 for detecting disturbances in the signals received from the adjacent node HUB5, and a switch S1 controllable by the detector DET1 to route the signals received from the adjacent node HUB1 in the third direction, i.e., to the coaxial cable network, and, if a disturbance is detected in the signals received from the adjacent node HUB, to route the signals received from the adjacent node HUB3 in the third direction.

The node HUB2 has a first input and a first output, which are connected to the adjacent node HUB1, and a second input and a second output, which are connected to the adjacent node HUB3. The node has at least a third output for transmitting signals in at least the third direction. The switch S1 is implemented as an optical switch. The first input of the node is connected to the second output via a series combination of an optical coupler K1 and an optical splitter SP1.

One output of the optical coupler K1 provides the input signal for the detector DET1. The second input of the node is connected via a further optical splitter SP3 to the first output. One output of the optical splitter SP1 and one output of the optical splitter SP3 are connected to the switch S1. The output of the switch S1 is connected to the third output.

In a preferred embodiment, an optical amplifier is connected between the switch S1 and the third output to amplify the signals to be routed onward. A further optical splitter SP2 is connected between the amplifier AMP and the third output to duplicate the amplified signals at least once and to provide at least one of the duplicated signals to a fourth output.

The detector DET1 detects the signal level tapped off by the coupler K1 and compares it with a predetermined threshold. If the signal level lies above the threshold, the detector DET1 will control the switch S1 in such a way that the signals applied to the switch S1 through the optical splitter SP1, e.g. a 2×2 coupler, are routed via the third output to the coaxial cable network. If the signal level lies below the threshold, the detector DET1 will control the switch S1 in such a way that the signals applied to the switch S1 through the optical splitter SP3, e.g. a 2×2 coupler, are routed via the third output to the coaxial cable network. A further optical splitter SP2 may be provided for routing the signals transferred by the switch S1 to two outputs simultaneously, the third output and a fourth one. Furthermore, the switch S1 may be followed by an amplifier AMP for amplifying the signals to be transmitted into the subsequent coaxial cable network or coaxial cable networks.

In a further preferred embodiment, the node HUB2 includes a further optical coupler, a further detector, and a control unit, which are not shown in order to simplify the illustration. The further optical coupler is connected between the second input of the node HUB2 and the further optical splitter SP3, so that one of its outputs provides the input signal for the further detector. The further detector is provided for detecting disturbances in the signals received from the adjacent node HUB3. The control unit is connected between the two detectors and the switch S1 to control the switch S in accordance with the output signals from the detectors using a predetermined switching matrix in a similar manner as in the node of FIG. 4.

In all three embodiments, the reserve lines are used exclusively for the transmission of signals sent out by the center. In the trouble-free case, all nodes are supplied with signals over the respective main trunk line, so that each reserve line has free capacity, which can also be used for additional data transmission. Each node may have, for example, a third input, a fifth output, and two further switches which are controlled by the detector DET1. Via the third input, additional data signals from a data source, for example, may be fed to the node HUB4. These are then transmitted, for example, via node HUB3 to node HUB2, where they are transferred via the fifth output to a data sink. The first further switch is arranged to route, under control of the detector DET1, the additional signals received via the third input to the first output in the trouble-free case, and the signals of the reserve line to the first output on the occurrence of a disturbance on the main trunk line. The second further switch is arranged to route, under control of the detector DET1, the additional data signals received via the second input to the fifth output in the trouble-free case, and the signals of the reserve line to the switch S1 on the occurrence of a disturbance on the main trunk line.

Outside the node, an evaluating device can be provided which routes the data signals received from the fifth output to the third input of the node if the data signals are destined for the next adjacent node but one, cf. the above example: node HUB3 as a relay station. A third further switch may be provided which is arranged to route, under control of the detector DET1, the additional data signals received via the second input to the first output in the trouble-free case if the node is to serve as a relay station, and to be open in the event of a disturbance on the main trunk line. In that case, the detector must incorporate an evaluating device which decides whether in the trouble-free case the data signals received via the second input are to be routed to the first output or the fifth output.

What is claimed is:

1. A node (HUB2, HUB3, HUB4, HUB5) of a point-to-multipoint network (NET) comprising:

a center (HE) that transmits signals to two initial nodes (HUB1, HUB6), the two initial nodes (HUB1, HUB6) being interconnected via a series combination of several nodes (HUB2, HUB3, HUB4, HUB5), wherein the node (HUB2, HUB3, HUB4, HUB5) receives signals from and transmits signals to its two adjacent nodes (HUB1, HUB3; HUB2, HUB4; HUB3, HUB5; HUB4, HUB6), to which it is connected, and in a third direction, the node (HUB2, HUB3, HUB4, HUB5) further comprising:

a detector (DET1) that detects disturbances in the signals received from one (HUB1; HUB2; HUB5; HUB6) of its adjacent nodes, a switch (S1) controlled by the detector (DET1) to route the signals received from said one adjacent node (HUB1; HUB2; HUB5; HUB6) to the other adjacent node (HUB3; HUB4; HUB3; HUB4) and/or in the third direction, and, if a disturbance is detected in the signals received from said one adjacent node (HUB1; HUB2; HUB5; HUB6), to route the signals received from the other adjacent node (HUB3; HUB4; HUB3; HUB4) to said one adjacent node (HUB1; HUB2; HUB5; HUB6) and/or in the third direction, wherein the center (HE) is connected to the two initial nodes (HUB1, HUB6) via optical fiber links, and wherein the several nodes (HUB2, HUB3, HUB4, HUB5) are connected to their adjacent nodes (HUB1, HUB3; HUB2, HUB4; HUB3, HUB5; HUB4, HUB6) via optical fiber links, wherein the node (HUB2, HUB3, HUB4, HUB5) further comprises:

a first input and a first output which are connected to said one adjacent node (HUB1; HUB2; HUB5; HUB6), a second input and a second output which are connected to the other adjacent node (HUB3; HUB4; HUB3; HUB4), wherein the switch (S1) is an optical switch, wherein the first input is connected to the second output via a series combination of an optical coupler (K1), the switch (S1), and an optical splitter (SP1), wherein one output of the optical coupler (K1) is connected to the detector (DET1), and wherein the second input of the node (HUB2, HUB3, HUB4, HUB5) is connected to the switch (S1), and the first output of the node (HUB2, HUB3, HUB4, HUB5) is connected to the optical splitter (SP1).

2. A node (HUB2, HUB3, HUB4, HUB5) as claimed in claim 1, the node (HUB2, HUB3, HUB4, HUB5) further comprising:

an optical amplifier (AMP) connected between the switch (S1) and the optical splitter (SP1) to amplify the signals to be routed onward; and at least a third output for transmitting signals in at least the third direction, wherein the optical splitter (SP1) duplicates the amplified signals at least twice, with each of its output signals being passed to a respective output of the node (HUB2, HUB3, HUB4, HUB5).

3. A node (HUB2, HUB3, HUB4, HUB5) as claimed in claim 2, the node (HUB2, HUB3, HUB4, HUB5) further comprising:

a second optical coupler (K2);

a second detector (DET2); and a control unit (CTRL), wherein the second optical coupler (K2) is connected between the second input of the node (HUB2, HUB3, HUB4, HUB5) and the switch (S1) so that one of its outputs provides the input signal to the second detector (DET2), wherein the second detector (DET2) detects disturbances in the signals received from the other adjacent node (HUB3; HUB4; HUB3; HUB4), and wherein the control unit (CTRL) is connected between the two detectors (DET1, DET2) and the switch (S1) to control the switch (S1) in accordance with the output signals from the detectors (DET1, DET2) using a predetermined switching matrix.

4. A node (HUB2, HUB3, HUB4, HUB5) as claimed in claim 1, the node (HUB2, HUB3, HUB4, HUB5) further comprising: a third input;

a third output; and two further switches;

wherein the first further switch is arranged to route, under control of the detector (DET1), the signals received via the third input to the first output of node (HUB2, HUB3, HUB4, HUB5) if no disturbance is detected, and the signals received via the second input of node (HUB2, HUB3, HUB4, HUB5) to the first output of node (HUB2, HUB3, HUB4, HUB5) if a disturbance is detected, and wherein the second further switch is arranged to route, under control of the detector (DET1), the signals received via the second input of node (HUB2, HUB3, HUB4, HUB5) to the third output if no disturbance is detected, and the signals received via the second input of node (HUB2, HUB3, HUB4, HUB5) to the switch (S1) if a disturbance is detected.

5. A node (HUB2, HUB3, HUB4, HUB5) of a point-to-multipoint network (NET) comprising:

a center (HE) that transmits signals to two initial nodes (HUB1, HUB6), the two initial nodes (HUB1, HUB6) being interconnected via a series combination of several nodes (HUB2, HUB3, HUB4, HUB5), p1 wherein the node (HUB2, HUB3, HUB4, HUB5) receives signals from and transmits signals to its two adjacent nodes (HUB1, HUB3; HUB2, HUB4; HUB3, HUB5; HUB4, HUB6), to which it is connected, and in a third direction, the node (HUB2, HUB3, HUB4, HUB5) further comprising:

a detector (DET1) that detects disturbances in the signals received from one (HUB1; HUB2; HUB5; HUB6) of its adjacent nodes, and a switch (S1) controlled by the detector (DET1) to route the signals received from said one adjacent node (HUB1; HUB2; HUB5; HUB6) to the other adjacent node (HUB3; HUB4; HUB3; HUB4) and/or in the third direction, and, if a disturbance is detected in the signals received from said one adjacent node (HUB1; HUB2; HUB5; HUB6), to route the signals received from the other adjacent node (HUB3; HUB4; HUB3; HUB4) to said one adjacent node (HUB1; HUB2; HUB5; HUB6) and/or in the third direction, wherein the center (HE) is connected to the two initial nodes (HUB1, HUB6) via optical fiber links, and wherein the several nodes (HUB2, HUB3, HUB4, HUB5) are connected to their adjacent nodes (HUB1, HUB3; HUB2, HUB4; HUB3, HUB5; HUB4, HUB6) via optical fiber links, the node (HUB2, HUB3, HUB4, HUB5) further comprising:

a first input and a first output which are connected to said one adjacent node (HUB1; HUB2; HUB5; HUB6), a second input and a second output which are connected to the other adjacent node (HUB3; HUB4; HUB3; HUB4);

wherein the switch (S1) is an optical switch, wherein the first input is connected to the second output via a series combination of an optical coupler (K1), the switch (S1), an optical splitter (SP1), and a second optical switch (S2) controlled by a second detector (DET2), and wherein one output of the optical coupler (K1) is connected to the detector (DET1), wherein the second input of the node (HUB2, HUB3, HUB4, HUB5) is connected to the switch (S1), and that the first output of the node (HUB2, HUB3, HUB4, HUB5) is connected to the second optical switch (S2).

6. A node (HUB2, HUB3, HUB4, HUB5) as claimed in claim 5, the node (HUB2, HUB3, HUB4, HUB5) further comprising:

an optical amplifier (AMP) connected between the switch (S1) and the optical splitter (SP1) to amplify the signals to be routed onward;

at least a third output for transmitting signals in at least the third direction, wherein the optical splitter (SP1) duplicates the amplified signals at least once, with one output signal of the optical splitter (SP1) sent to the second switch (S2), and a second output signal of the optical splitter (SP1) sent to the third output of the node (HUB2, HUB3, HUB4, HUB5).

7. A node (HUB2, HUB3, HUB4, HUB5) of a point-to-multipoint network (NET) comprising:

a center (HE) that transmits signals to two initial nodes (HUB1, HUB6), the two initial nodes (HUB1, HUB6) being interconnected via a series combination of several nodes (HUB2, HUB3, HUB4, HUB5), wherein the node (HUB2, HUB3, HUB4, HUB5) receives signals from and transmits signals to its two adjacent nodes (HUB1, HUB3; HUB2, HUB4; HUB3, HUB5; HUB4, HUB6), to which it is connected, and in a third direction, the node (HUB2, HUB3, HUB4, HUB5) further comprising:

a detector (DET1) that detects disturbances in the signals received from one (HUB1; HUB2; HUB5; HUB6) of its adjacent nodes, a switch (S1) controlled by the detector (DET1) to route the signals received from said one adjacent node (HUB1; HUB2; HUB5; HUB6) to the other adjacent node (HUB3; HUB4; HUB3; HUB4) and/or in the third direction, and, if a disturbance is detected in the signals received from said one adjacent node (HUB1; HUB2; HUB5; HUB6), to route the signals received from the other adjacent node (HUB3; HUB4; HUB3; HUB4) to said one adjacent node (HUB1; HUB2; HUB5; HUB6) and/or in the third direction, wherein the center (HE) is connected to the two initial nodes (HUB1, HUB6) via optical fiber links, and wherein the several nodes (HUB2, HUB3, HUB4, HUB5) are connected to their adjacent nodes (HUB1, HUB3; HUB2, HUB4; HUB3, HUB5; HUB4, HUB6) via optical fiber links, wherein the node (HUB2, HUB3, HUB4, HUB5) further comprises:

a first input and a first output which are connected to said one adjacent node (HUB1; HUB2; HUB5; HUB6), a second input and a second output which are connected to the other adjacent node (HUB3; HUB4; HUB3; HUB4), and at least a third output for transmitting signals in at least the third direction, wherein the switch (S1) is an optical switch, wherein the first input is connected to the second output via a series combination of an optical coupler (K1) and an optical splitter (SP1), wherein one output of the optical coupler (K1) is connected the detector (DET1), wherein the second input of the node (HUB2, HUB3, HUB4, HUB5) is connected to the first output of the node (HUB2, HUB3, HUB4, HUB5) via a third optical splitter (SP3), wherein one output of each of the optical splitters (SP1, SP3) is connected to the switch (S1), and wherein the switch (S1) is connected to the third output of the node (HUB2, HUB3, HUB4, HUB5).

8. A node (HUB2, HUB3, HUB4, HUB5) as claimed in claim 7, that the node (HUB2, HUB3, HUB4, HUB5) further comprising:

an optical amplifier (AMP) connected between the switch (S1) and the third output of the node (HUB2, HUB3, HUB4, HUB5) to amplify the signals to be routed onward; and a second optical splitter (SP2) connected between the optical amplifier (AMP) and the third output to duplicate the amplified signals at least once and to pass one of the duplicated signals to a fourth output of the node (HUB2, HUB3, HUB4, HUB5).

* * * * *